(12) United States Patent
Amemiya et al.

(10) Patent No.: US 12,498,144 B2
(45) Date of Patent: Dec. 16, 2025

(54) INFRARED ABSORBER, METHOD FOR MANUFACTURING SAME, BLACKBODY RADIATION DEVICE, AND RADIATIVE COOLING DEVICE

(71) Applicant: National Institute of Advanced Industrial Science and Technology, Tokyo (JP)

(72) Inventors: Kuniaki Amemiya, Tsukuba (JP); Yuhei Shimizu, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 246 days.

(21) Appl. No.: 18/276,142

(22) PCT Filed: Feb. 1, 2022

(86) PCT No.: PCT/JP2022/003824
§ 371 (c)(1),
(2) Date: Aug. 7, 2023

(87) PCT Pub. No.: WO2022/181259
PCT Pub. Date: Sep. 1, 2022

(65) Prior Publication Data
US 2024/0125518 A1 Apr. 18, 2024

(30) Foreign Application Priority Data
Feb. 24, 2021 (JP) .................................. 2021-027602

(51) Int. Cl.
*F24S 70/275* (2018.01)
*F24F 13/18* (2006.01)

(52) U.S. Cl.
CPC ............ *F24S 70/275* (2018.05); *F24F 13/18* (2013.01)

(58) Field of Classification Search
CPC ........ F24S 70/275; F24S 70/225; F24F 13/18; G02B 5/00; G02B 5/22
(Continued)

(56) References Cited

U.S. PATENT DOCUMENTS 4,055,707 A * 10/1977 McDonald ............ F24S 70/225
205/208
5,384,571 A * 1/1995 Myers .................. G02B 5/0268
342/3
(Continued)

FOREIGN PATENT DOCUMENTS

| EP | 3767393 A1 | 1/2021 |
| JP | 2004-333129 A | 11/2004 |

(Continued)

OTHER PUBLICATIONS

K. Amemiya et al., "Perfect blackbody sheets from nano-precision microtextured elastomers for light and thermal radiation management," Journal Materials Chemistry C, vol. 7, Apr. 23, 2019, pp. 5418-5425. (discussed in the spec).

*Primary Examiner* — Steve S Tanenbaum
(74) *Attorney, Agent, or Firm* — Troutman Pepper Locke LLP; James E. Armstrong, IV; Nicholas J. DiCeglie, Jr.

(57) ABSTRACT

Provided are an infrared absorber having extremely low reflectivity in the wavelength band of infrared rays, a method for manufacturing the same, a black-body radiation device, and a radiative cooling device. Provided is an infrared absorber 10 provided with: an absorption layer 11 comprising carbon black and a resin; and, on the absorption layer 11, a surface layer 12 that comprises a resin including essentially no pigment and that has an optical confinement structure 13 in which a plurality of minute projections are (Continued)

formed on the surface thereof, the hemispherical total reflectivity of the infrared absorber 10 in infrared wavelengths of 5-15 μm being 0.2% or less. Further provided are a method for manufacturing the infrared absorber, a black-body radiation device, and a radiative cooling device.

14 Claims, 15 Drawing Sheets

(58) Field of Classification Search
USPC .......................................................... 165/48.2
See application file for complete search history.

(56) References Cited

U.S. PATENT DOCUMENTS

| 10,371,579 | B1 * | 8/2019 | Johnson | ................... G01J 5/53 |
| 2009/0323189 | A1 | 12/2009 | Taniguchi | |
| 2020/0217720 | A1 | 7/2020 | Yasuda | |
| 2020/0346421 | A1 | 11/2020 | Amemiya | |

FOREIGN PATENT DOCUMENTS

| JP | 2006-250513 A | 9/2006 | |
| JP | 2008-233850 A | 10/2008 | |
| WO | 2017/033031 A1 | 3/2017 | |
| WO | 2019/058833 A1 | 3/2019 | |
| WO | WO-2019087439 A1 * | 5/2019 | ............. G02B 1/113 |
| WO | 2019/176409 A1 | 9/2019 | |

* cited by examiner

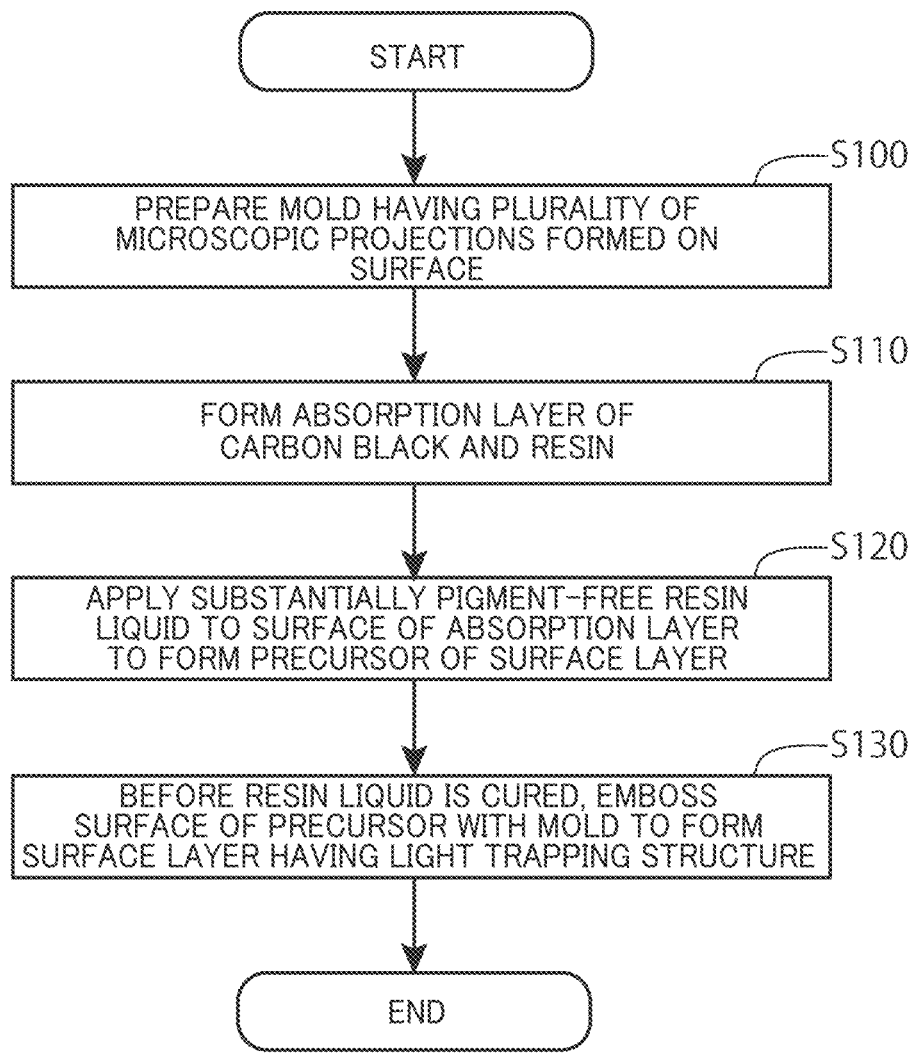

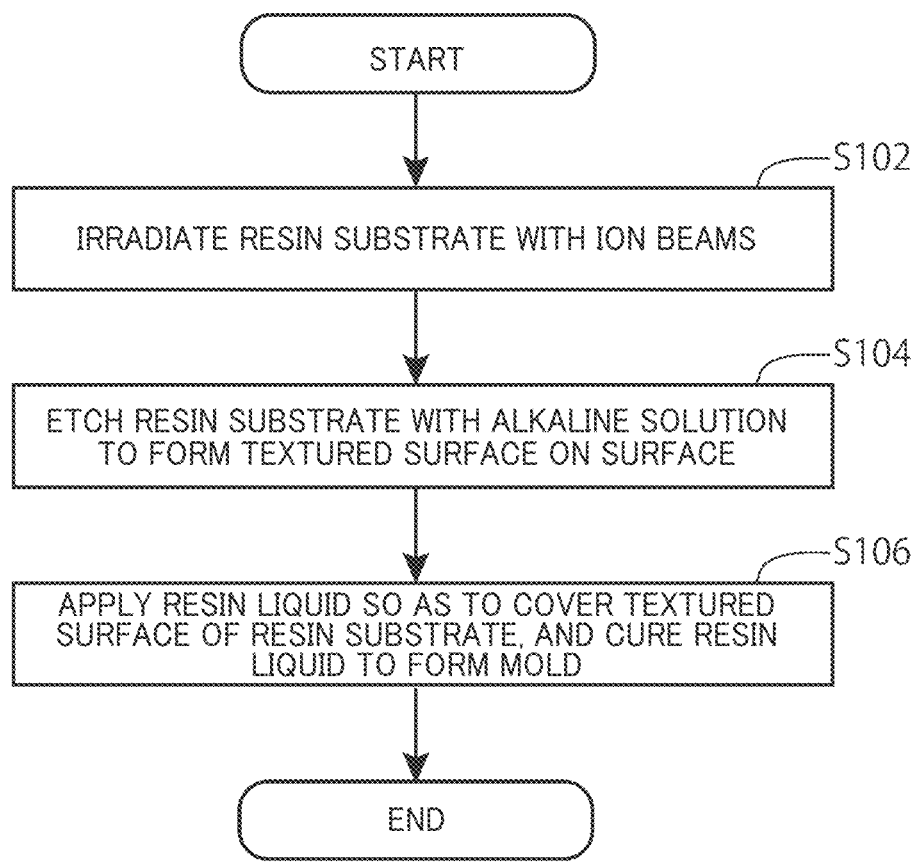

INFRARED ABSORBER, METHOD FOR MANUFACTURING SAME, BLACKBODY RADIATION DEVICE, AND RADIATIVE COOLING DEVICE

TECHNICAL FIELD

The present invention relates to a technology pertaining to infrared absorption, and more particularly to an infrared absorber having an extremely low reflectance, a manufacturing method thereof, a blackbody radiation device, and a radiative cooling device.

BACKGROUND ART

According to Kirchhoff's law, the emissivity of an object is equal to the absorptance of the object. Emissivity is the ratio of radiance emitted by a real object to radiance emitted by a blackbody. That is, objects with high absorptance, approaching 100%, closely resemble a blackbody and radiate most efficiently. According to Planck's law, the radiation spectrum emitted by a blackbody can be expressed as a function of temperature alone.

At or around room temperature (0° C. to 40° C.), the wavelength of infrared rays predominantly emitted by objects falls within the range of 8 µm to 14 µm. In this wavelength range of infrared rays, objects with high absorptance, or in other words, high emissivity, are useful for applications such as radiative cooling devices and reference infrared radiators.

In such applications, objects with extremely high infrared absorptance of 99.5% or higher are desired. The absorptance, or emissivity, depends on the material and surface condition of the object. In general, the emissivity is low on polished metal surfaces, while the emissivity is high on oxidized or roughened surfaces. As materials having high emissivity, structures with aligned carbon nanotubes formed on the surface have been developed, and carbon nanotube structures with a hydrophobic coating formed on the surface of the aligned carbon nanotubes are known (see Patent Document 1). Aligned carbon nanotubes are prone to breakage by physical contact and have low contact resistance, making them unsuitable for use in general environments. A blackbody calibration target having a fine needle-like texture formed by ICP etching on the surface of a silicon substrate has been developed (see Patent Document 2).

The inventors of the present invention have developed light absorbers having low reflectance, and have published their findings (see Patent Document 3 and Non-Patent Document Patent Document 1: PCT International Publication No. WO 2017/33031
Patent Document 2: U.S. patent Ser. No. 10/371,579
Patent Document 3: PCT International Publication No. WO 2019/087439
Non-Patent Document 1: K. Amemiya et al., J. Mater. Chem. C, 2019, 7, pp. 5418-5425

DISCLOSURE OF THE INVENTION

Problems to be Solved by the Invention

An object of the present invention is to provide a novel and useful infrared absorber having extremely low reflectance in the infrared wavelength band, a method of manufacturing the same, a blackbody radiation device, and a radiative cooling device.

Means for Solving the Problems

One aspect of the present invention provides an infrared absorber including: an absorption layer consisting of carbon black and resin; and a surface layer consisting of substantially pigment-free resin, formed on the absorption layer and including a light trapping structure with a plurality of microscopic projections formed on a surface, in which the infrared absorber is configured to have a hemispherical total reflectance of 0.2% or less in a range of infrared wavelengths between 5 µm and 15 µm inclusive.

According to the above aspect, the light trapping structure of the surface layer propagates infrared rays to the inside of the surface layer, allowing the carbon black particles in the absorber to absorb infrared rays over a wide wavelength range. In addition, the surface layer is substantially pigment-free, thus preventing infrared rays from leaking out due to scattering by pigments near the surface of the surface layer. Further, the carbon black particles in the absorption layer absorb infrared rays over a wide wavelength range, and partially scattered infrared rays are absorbed by the resin of the surface layer and hardly leak out of the surface layer. As a result, the infrared absorber can significantly reduce the hemispherical total reflectance, allowing for providing the infrared absorber configured to have a hemispherical total reflectance of 0.2% or less in the range of infrared wavelengths between 5 µm and 15 µm inclusive.

An other aspect of the present invention provides a method of manufacturing an infrared absorber, in which the method includes the steps of: preparing a mold, including a substep of irradiating a resin substrate with an ion beam; forming an absorption layer using carbon black and resin; applying a substantially pigment-free resin liquid onto a surface of the absorption layer to form a precursor of a surface layer; embossing a surface of the precursor with the mold including a surface with a plurality of microscopic projections formed on the surface before the resin liquid cures, and curing the resin liquid to form a surface layer including a light trapping structure, in which the infrared absorber thus formed is configured to have a hemispherical total reflectance of 0.2% or less in a range of infrared wavelengths between 5 µm and 15 µm inclusive.

The other aspect of the present invention described above can provide the infrared absorber including an absorption layer for infrared rays as an underlayer formed of carbon black and resin; and a surface layer as an upper layer formed of substantially pigment-free resin, including a light trapping structure formed with microscopic projections on the surface, in which the infrared absorber is configured to have a hemispherical total reflectance of 0.2% or less in the range of infrared wavelengths between 5 µm and 15 µm inclusive.

Still another aspect of the present invention provides a flat-plate blackbody device including the infrared absorber of the above aspects. Yet another aspect of the present invention provides a radiative cooling device including the infrared absorber of the above aspects.

BRIEF DESCRIPTION OF THE DRAWINGS

FIG. 5 is a flowchart illustrating a method of manufacturing the infrared absorber according to the first embodiment;

FIG. 6 is a flowchart illustrating a method of forming a mold;

PREFERRED MODE FOR CARRYING OUT THE INVENTION

Figure 1:
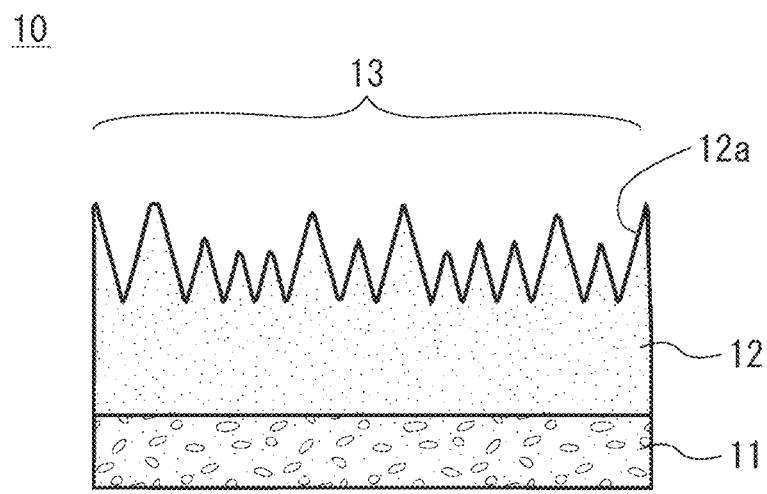
FIG. 1 is a schematic diagram illustrating a structure of an infrared absorber according to a first embodiment.

An embodiment of the present invention will now be described with reference to the accompanying drawings. Note that elements common to a plurality of drawings are denoted by the same reference numerals, and the repetition of detailed description of the elements is omitted.

FIRST EMBODIMENT

FIG. 1 is a schematic diagram illustrating a structure of an infrared absorber according to a first embodiment. Referring to FIG. 1, an infrared absorber 10 according to the first embodiment includes an absorption layer 11 and a surface layer 12 formed on the absorption layer 11. The absorption layer 11 is a resin layer containing carbon black. The surface layer 12 is a resin layer consisting of substantially pigment-free resin. A light trapping structure 13 is formed on a surface 12a of the surface layer 12.

The thickness of the absorption layer 11 is preferably in the range of 20 μm to 500 μm, and more preferably in the range of 20 μm to 300 μm. The heat transfer decreases when the thickness of the absorption layer 11 is excessively thick, and the infrared absorptance decreases when the absorption layer 11 is excessively thin. The absorption layer 11 may use at least one resin selected from the group consisting of epoxy resin, polyester resin, polypropylene resin, acrylic resin, polycarbonate resin, and vinyl chloride resin. The absorption layer 11 preferably uses at least one resin selected from the group consisting of epoxy resin, acrylic resin, polycarbonate resin and vinyl chloride resin, due to their good infrared absorption property over a wide band of wavelengths.

The absorption layer 11 contains carbon black. Carbon black has a high infrared absorption property over a wide band of the infrared wavelength range. Carbon black having various particle sizes such as carbon black having an average particle size of 10 nm to 300 nm can be used. The weight ratio of carbon black to resin is preferably 1% to 20% in the absorption layer 11. When the weight ratio of carbon black is less than 1%, the absorption layer 11 will need to be thickened to secure the infrared absorptance, which leads to a decrease heat transfer. When the weight ratio of carbon black is greater than 20%, it becomes difficult to satisfactorily disperse the carbon black in the resin.

The absorption layer 11 may contain aligned carbon nanotubes in addition to carbon black, from the viewpoint of further enhancing the infrared absorption property. In addition to carbon black, the absorption layer 11 may contain inorganic black pigments such as fine particles of aluminum, platinum, gold, silver, aluminum oxide, and mixtures thereof.

The thickness of the surface layer 12 is preferably in the range of 100 μm to 200 μm, which allows for sufficiently forming the light trapping structure 13 composed of numerous projections having the height of several tens of micrometers. Note that the thickness is a distance from the bottom of the surface layer 12 to the plane having an average height of the surface (which is a so-called reference surface defined in ISO 25178). The surface layer 12 is preferably at least one resin selected from the group consisting of ultraviolet curing resin, silicone resin, epoxy resin, acrylic resin, polyester resin, and polyurethane resin.

The light trapping structure 13 is formed on the surface 12a of the surface layer 12. The light trapping structure 13 is composed of numerous microscopic projections formed on the surface 12a of the surface layer 12. The light trapping structure 13 captures light including externally incident infrared rays into the base of the projections, and further into the surface layer 12. The light trapping structure 13 specifically includes a plurality of projections formed to protrude outward from the surface. Tips of the projections have a connected ridge-like shape or a conical shape. The cross section of the projection has a shape that gradually widens from the tips toward the base. In the case of the tips having a connected ridge-like shape, the distance between the adjoining ridges is preferably 0.1 μm to 100 μm, and more preferably 1 μm to 100 μm for the wavelength range of mid-infrared rays. In the case of the tips having a conical shape, the distance between the adjoining tips is preferably 0.1 μm to 100 μm, and more preferably 1 μm to 100 μm for the wavelength range of mid-infrared rays. The shape of the light trapping structure 13 is, for example, transferred from the textured shape on the surface of the mold formed as described later in FIG. 6.

The surface layer 12 is substantially pigment-free. The presence of pigments in the surface layer 12 scatters infrared rays; and in particular, pigments in the portion closer to the surface of the surface layer 12 scatter more infrared rays, which causes leakage of infrared rays from the surface layer 12 to the outside. In such cases, the absorptance of the infrared absorber decreases. The phrase of "substantially pigment-free" refers not only to cases of containing no pigments at all, but also to cases of containing an extremely small quantity of pigments such that infrared rays scattered by pigment particles are negligible within the scope that can achieve the effects of the present invention.

Figure 2:
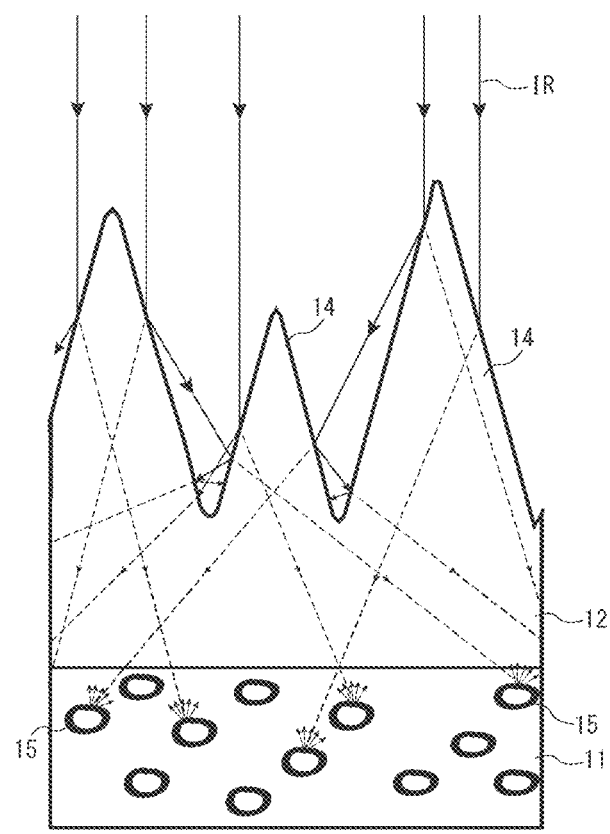
FIG. 2 is an explanatory diagram of the absorption principle of the infrared absorber according to the first embodiment.

FIG. 2 is an explanatory diagram of the principle of absorption by the infrared absorber according to the first embodiment. Referring to FIG. 2, external infrared rays IR are incident on the surface of the numerous projections 14 of the light trapping structure 13 of the surface layer 12. A portion of the incident infrared rays is reflected on the surface of the projections 14, and other portions of the infrared rays enter the inside of the projection 14. Since the shape of the projections 14 widens towards the base, the reflected infrared rays travel towards the lower part of the projections 14, as shown by the solid lines, and hardly leak out of the surface layer 12. The intensity of the reflected infrared rays decreases with each reflection.

Infrared rays enter the inside of the projection 14 (indicated by the broken lines) and propagate through the resin that forms the surface layer 12. The surface layer 12 is substantially pigment-particle-free, thus there is no scattering which may otherwise be caused by pigment particles, and scattered infrared rays can be prevented from leaking out of the surface layer 12. A portion of the infrared rays is absorbed by the resin of the surface layer 12.

The infrared rays reach the absorption layer 11 and are absorbed by carbon black particles 15 over a wide range of wavelengths. Some of the infrared rays are scattered by the carbon black particles 15. The scattered infrared rays are absorbed and scattered by other carbon black particles 15. An extremely small portion of the infrared rays returns to the surface layer 12, but is absorbed by the resin of the surface layer 12, resulting in an extremely small quantity of infrared rays leaking out of the surface layer 12.

Figure 3A:
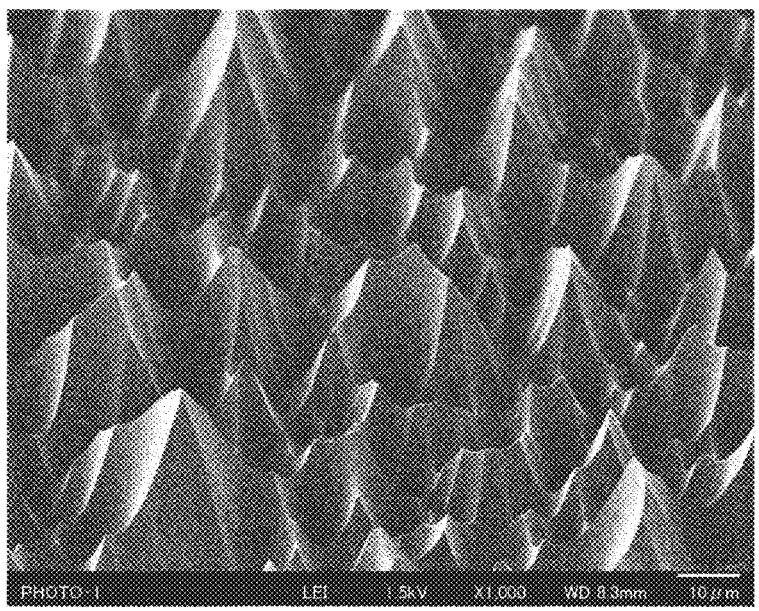
FIG. 3A is an electron micrograph showing an example of the surface shape of the light trapping structure.

FIG. 3A is an electron micrograph showing an example of the surface shape of the light trapping structure. Referring to FIG. 3A in conjunction with FIG. 1, the light trapping structure 13 includes a plurality of projections having a connected ridge-like shape on the surface 12a of the surface layer 12, with numerous projections having gradually widening bases. It can be seen that the connected ridge-like shapes are formed at a distance of 1 µm to several tens of micrometers apart. This shape of the light trapping structure 13 is formed when using the mold prepared in S106 of FIG. 6 described later. The mold may be used for making a re-transfer mold for use.

Figure 3B:
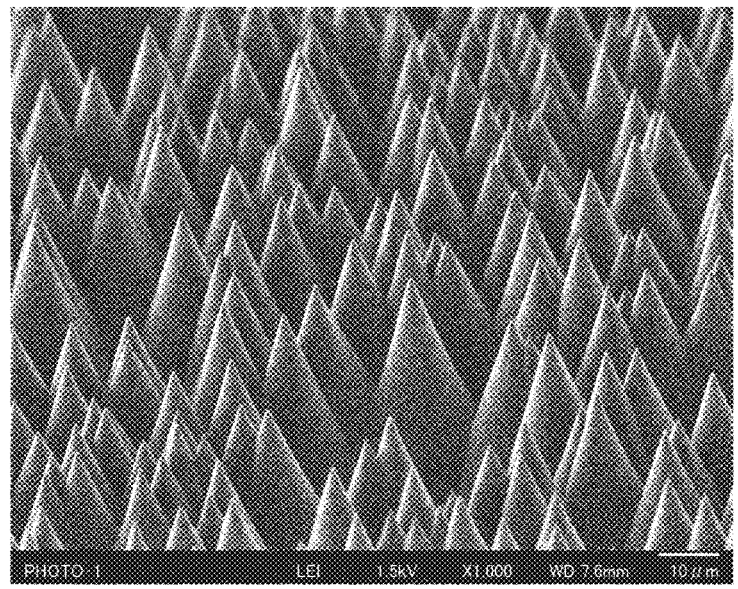
FIG. 3B is an electron micrograph showing another example of the surface shape of the light trapping structure.

FIG. 3B is an electron micrograph showing another example of the surface shape of the light trapping structure, which is formed when using a re-transfer mold made from the mold used when forming the infrared absorber in FIG. 3A. Referring to FIG. 3B, it can be seen that the light trapping structure has a plurality of projections with conical tips, and the cross section of the projection has a shape that gradually widens from the tips towards the surface, in which the adjoining conical tips are formed at a distance of 1 µm to several tens of micrometers apart.

Note that the infrared absorber 10 may include a base material (not illustrated) under the absorption layer 11. The base material may be, for example, a material used for forming the absorption layer 11 by coating or the like, such as PDMS, or may be a material consisting of a thermally conductive material as in the second embodiment described later.

In the infrared absorber 10 according to the present embodiment, the light trapping structure 13 of the surface layer 12 captures infrared rays into the surface layer 12 and propagates the infrared rays to the absorption layer 11, in which the carbon black particles in the absorption layer 11 absorb the infrared rays over a wide range of wavelengths. In addition, the surface layer 12 is substantially pigment-free, thus there is no scattering which may otherwise be caused by pigment particles, and scattered infrared rays can be prevented from leaking out of the surface layer 12. Further, the carbon black particles in the absorption layer 11 absorb infrared rays over a wide range of wavelengths, and partially the scattered infrared rays are absorbed by the resin of the surface layer 12 and hardly leak out of the surface layer 12. As a result, the infrared absorber 10 can significantly reduce reflectance, and can be configured to have a hemispherical total reflectance of 0.2% or less in the range of infrared wavelengths between 5 µm and 15 µm inclusive, or can further be configured to have a hemispherical total reflectance of 0.1% or less in the range of infrared wavelengths between 7 µm and 14 µm inclusive.

The infrared absorber 10 according to the present embodiment has the surface layer 12 formed by curing a resin, thus the light trapping structure 13 formed on the surface 12a has higher contact resistance than conventional infrared absorbers, and the increase in hemispherical total reflectance is suppressed even when touched by hand because the light trapping structure 13 is less likely to deteriorate.

SECOND EMBODIMENT

Figure 4:
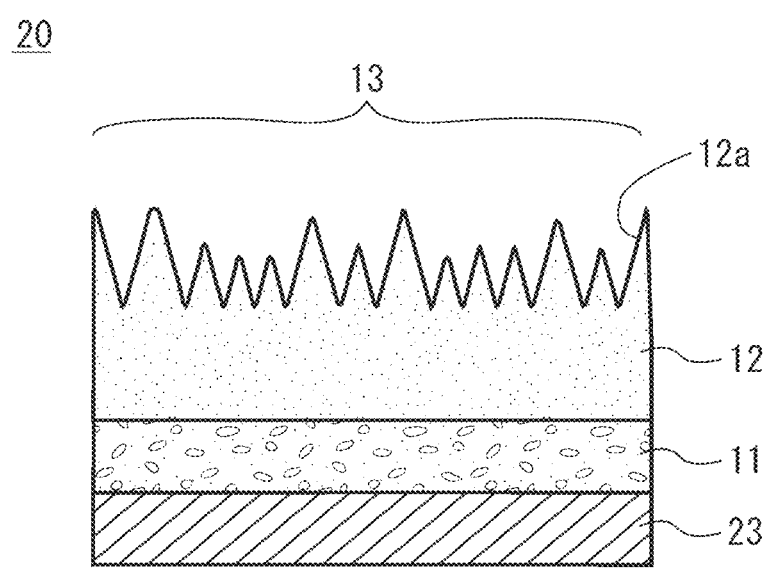
FIG. 4 is a schematic diagram illustrating a structure of an infrared absorber according to a second embodiment.

FIG. 4 is a schematic diagram illustrating a structure of an infrared absorber according to a second embodiment. Referring to FIG. 4, the infrared absorber 20 includes an absorption layer 11, a surface layer 12 formed on the absorption layer 11, and a base material 23 under the absorption layer 11. Other than that, the infrared absorber 20 has the configuration, function and effect similar to those of the infrared absorber 10 according to the first embodiment illustrated in FIG. 1. The base material 23 consists of a thermally conductive material. Thus, by configuring the medium for controlling the temperature of the flat-plate blackbody device to be in contact with the base material 23, the temperature of the infrared absorber 20 can be easily controlled, and the uniformity of temperature of the infrared absorber 20 can be improved. In addition, in the radiative cooling device, by configuring the cooling target object to be in contact with the base material 23, the cooling target object can be efficiently cooled by radiation of infrared rays from the infrared absorber 20. The base material 23 may be selected as a substrate that includes at least one metal chosen from the group consisting of aluminum, copper, silver, and gold, or as a substrate that includes at least one non-metal material chosen from the group consisting of silicon substrate, SiC substrate, and AlN substrate.

FIG. 5 is a flowchart illustrating a method of manufacturing the infrared absorber according to the first embodiment. A method of manufacturing the infrared absorber of the present embodiment will be described with reference to FIG. 5 in conjunction with FIG. 1.

First, a mold having a plurality of microscopic projections formed on the surface is prepared (S100). A method of preparing the mold will be described with reference to FIG. 6.

Next, an absorption layer is formed of carbon black and resin (S110). Specifically, carbon black and resin are used, and a solvent may be used depending on the type of resin material, and mixed by equipment such as a planetary centrifugal mixer, kneader, ball mill, or the like. The mixture is applied onto a substrate or a resin sheet, such as PDMS, and cured. The resin may use at least one resin selected from the group consisting of epoxy resin, polyester resin, polypropylene resin, acrylic resin, polycarbonate resin, and vinyl chloride resin. The absorption layer 11 preferably uses at least one resin selected from the group consisting of epoxy resin, acrylic resin, polycarbonate resin and vinyl chloride resin, due to their good infrared absorption property over a wide band of wavelengths. Carbon black has a high infrared absorption property over a wide band of the infrared wavelength range. Carbon black having various particle sizes, such as carbon black having an average particle size of 10 nm to 300 nm, can be used. The weight ratio of carbon black to resin is preferably 1% to 20%. When the weight ratio of carbon black is less than 1%, and the thickness of the absorption layer 11 should be increased to ensure the infrared absorptance, which leads to a decrease of heat transfer. When the weight ratio of carbon black is greater than 20%, it becomes difficult to disperse the carbon black well in the resin. The thickness of the cured absorption layer is preferably in the range of 20 μm to 500 μm, and more preferably in the range of 20 μm to 300 μm.

A substantially pigment-free resin liquid is applied onto the surface of the absorption layer to form a precursor of the surface layer (S120). Specifically, a resin liquid containing resin, and also containing a solvent if necessary depending on the resin material, is applied onto the surface of the absorption layer. The resin is preferably at least one resin selected from the group consisting of ultraviolet curing resin, silicone resin, epoxy resin, acrylic resin, polyester resin, and polyurethane resin. The ultraviolet curing resin is preferable because ultraviolet curing resin is curable by ultraviolet irradiation in a short time, and also preferable because ultraviolet curing resin is curable at room temperature.

Next, before the resin liquid is cured, the surface of the precursor is embossed with a mold having a plurality of microscopic projections formed on its surface, and the resin liquid is cured to form the surface layer 12 having the light trapping structure 13 on the surface (S130). The shape of the plurality of microscopic projections formed on the surface of the mold are transferred by embossing onto the surface of the precursor of the surface layer, to form the light trapping structure 13. The resin liquid is preferably ultraviolet curing resin, and the ultraviolet curing resin may contain other resins. The mold is preferably made of a material that transmits ultraviolet rays. As a result, the precursor of the surface layer can be cured in a short time. Thus, the infrared absorber 10 is formed, which is configured to have a hemispherical total reflectance of 0.2% or less in the range of infrared wavelengths between 5 μm and 15 μm inclusive. The substrate or resin sheet used in S110 may be peeled off from the infrared absorber 10, or may be left unpeeled. The mold prepared in S100 is formed, for example, as follows.

FIG. 6 is a flowchart illustrating a method of forming a mold. The method of forming a mold will be described with reference to FIG. 6.

First, the resin substrate is irradiated with ion beams (S102). Specifically, ion beams accelerated by a cyclotron are irradiated onto a resin substrate such as allyl diglycol carbonate resin (CR-39). Consequently, a large number of ion tracks are formed near the surface of the resin substrate. Ion tracks are preferably randomly distributed. Oxygen ions may be used for ion beams, but any one of Ne ions and ions heavier than Ne ions is preferably used. This is because when ions having a weight equal to or greater than Ne ions are used, etching is likely to proceed selectively along the ion tracks on the resin substrate, and the final pit aspect ratio (pit depth/pit radius) can be increased. The resin substrate may be polycarbonate, polyethylene terephthalate, polyimide, cellulose nitrate, or the like.

The acceleration energy of the ion beams is preferably 200 MeV or higher, which enables a sufficient penetration depth and provides a large pit aspect ratio even when a large pit radius is used. Irradiation density of the ion beams to the resin substrate is appropriately selected, but is preferably $1 \times 10^5/cm^2$ to $1 \times 10^7/cm^2$ from the viewpoint of the density of pits sufficient to capture light having a wavelength of far-infrared rays.

Next, the resin substrate irradiated with ion beams is etched with an alkaline solution to form a textured surface on the surface of the resin substrate (S104). Specifically, an alkaline solution is prepared using an aqueous solution of sodium hydroxide or potassium hydroxide, and the resin substrate irradiated with ion beams is immersed in the solution for a predetermined time while being heated, for example, to 70° C. Next, the resin substrate is washed with water and dried.

Next, a resin liquid is applied so as to cover the textured surface of the resin substrate formed in S104, cured, and peeled off from the resin substrate to form a mold (S106). The shape of the textured surface formed in step S104 is transferred to the surface of the mold to form another textured surface, which has an inverted shape of the textured surface formed in step S104. The mold is formed of, for example, a gas permeable elastomer material, a metal film, silicone resin, or photocurable resin. The mold preferably uses a gas permeable elastomer material such as PDMS (polydimethylsiloxane), which can easily remove the air bubbles existing between the mold and the coating of the resin liquid in the step of forming the surface layer (S130 in FIG. 5). When a mold is formed of a metal film, for example, an electrode layer for electrolytic plating of a Ti film having a thickness of 50 nm and a Cu film having a thickness of 300 nm may be formed by sputtering on the textured surface formed in S104, and then, a Ni plating film having a thickness of 500 μm may be formed by electrolytic plating on the electrode layer. The mold may be formed by electroless plating.

The textured surface of the mold specifically has a plurality of projections formed so as to protrude outward from the surface. The tips of the projections have a connected ridge-like shape or a conical shape. The cross section of the projection has a shape that gradually widens from the tips toward the base. In the case of the tips having a connected ridge-like shape, the distance between the adjoining ridges is preferably 0.1 μm to 100 μm, and more preferably 1 μm to 100 μm for the wavelength range of mid-infrared rays. In the case of the tips having a conical shape, the distance between adjoining tips is preferably 0.1 μm to 100 μm, and more preferably 1 μm to 100 μm for the wavelength range of mid-infrared rays.

When the light trapping structure 13 is formed using the mold formed in S106, a textured surface is formed as shown in the electron micrograph of FIG. 3A, in which the tips of the projections have a connected ridge-like shape.

Note that the mold may be a resin substrate on which the shape of the textured surface of the mold formed in step S106 has been transferred by coating a resin liquid. Further, the mold may be a resin substrate having a textured surface formed in step S104. When the light trapping structure 13 is formed using such a mold, a textured surface with projections having conical tips shown in FIG. 3B is formed, and similar infrared absorption effects can be achieved.

EXAMPLE 1

Example 1 is an example of the infrared absorber 20 of the second embodiment illustrated in FIG. 4. An Al (aluminum) plate was used as the base material 23. On the Al plate, acrylic gouache paint (Turner Colour Works Ltd., product name: Acryl Gouache, Original Colour Lamp Black (PBk7) was applied as an absorption layer 11 using a bar coater and dried (thickness: 100 μm). The surface of the absorption layer 11 was coated with a transparent acrylic resin-based ultraviolet curing resin liquid (manufactured by PADICO Co., Ltd., product name: UV-LED Resin, Star Drop Hard) to form a layer having a thickness of 150 μm, embossed with a mold made of PDMS formed as described in FIG. 6, and irradiated with ultraviolet rays from the back surface of the mold (ultraviolet lamp (LED&UV LAMP, manufactured by Eruberu Co., Ltd.), 6 W, irradiation time: 3 minutes), thereby forming the surface layer 12 having a light trapping structure. The light trapping structure of Example 1 has a shape shown in FIG. 3A.

EXAMPLE 2

Example 2 is an example of the infrared absorber 10 of the first embodiment illustrated in FIG. 1. The absorption layer 11 is a resin layer containing carbon black, in which carbon black (Strem Chemicals, Inc., product name: Acetylene Carbon Black (99.99%) (50% compressed), average particle size 42 nm) was mixed in an amount of 5% by weight with respect to two-part epoxy resin (manufactured by Nissin Resin Co., Ltd., product name: Crystal Resin) using a planetary centrifugal mixer. The mixture was applied onto an allyl diglycol carbonate resin (CR-39) plate by a bar coater and cured to a thickness of 150 µm. Two-part epoxy resin (manufactured by Nissin Resin Co., Ltd., product name: Crystal Resin) was applied onto the surface of the absorption layer 11 to a thickness of 150 µm, embossed with a mold made of PDMS used in Example 1, and cured to form a surface layer 12 having a light trapping structure, whereby an infrared absorber was obtained.

COMPARATIVE EXAMPLE 1

Comparative Example 1 has a surface layer similar to that in Example 1, on an Al plate. The ultraviolet curing resin liquid used in Example 1 was used to form a surface layer having a thickness of 150 µm on the Al plate as in the case of Example 1, the surface was embossed with a mold made of PDMS similar to that in Example 1, the resin liquid was cured, and the mold was peeled off to form a light trapping structure.

COMPARATIVE EXAMPLE 2

Comparative Example 2 is an example in which a light trapping structure is formed on the absorption layer of Example 2. A mixture of two-part epoxy resin and carbon black formulated in a manner similar to Example 2 was applied onto a PDMS sheet, embossed with a mold made of PDMS similar to that in Example 2, the mixture was cured, and the mold was peeled off to form a light trapping structure.

COMPARATIVE EXAMPLE 3

Comparative Example 3 is an example in which an absorption layer is a resin layer containing silicone resin and carbon black, and a light trapping structure is formed on the surface. A main agent and a curing agent of a two-part curable silicone composition (manufactured by Shin-Etsu Silicone Co., Ltd. main agent SIM-360, curing agent CAT-360) were mixed at a ratio of 9:1; further, carbon black was mixed in an amount of 5% by weight with respect to the silicone composition; after defoaming, the mixture was dropped onto the textured surface of a mold made of CR-39 formed as described in S104 of FIG. 6 to cover the surface; and after defoaming in a vacuum desiccator, the mixture was cured at room temperature for 12 hours and peeled off, whereby a silicone rubber having a light trapping structure formed on the surface was obtained.

COMPARATIVE EXAMPLE 4

Comparative Example 4 only has a surface layer similar to that in Example 2, on an Al plate. A surface layer having a thickness of 150 µm was formed on an aluminum (Al) plate using the two-part epoxy resin used in Example 2 in a manner similar to Example 1, the surface was embossed with a mold made of PDMS similar to that in Example 1, the resin was cured, and the mold was peeled off to form a light trapping structure.

Figure 7A:
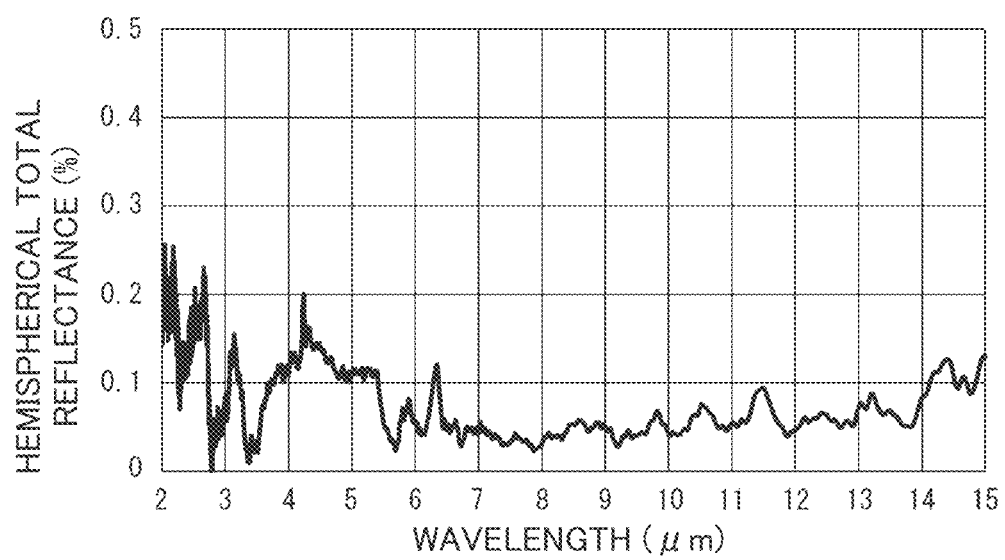
FIG. 7A is a diagram illustrating the hemispherical total reflectance in Example 1.
Figure 7B:
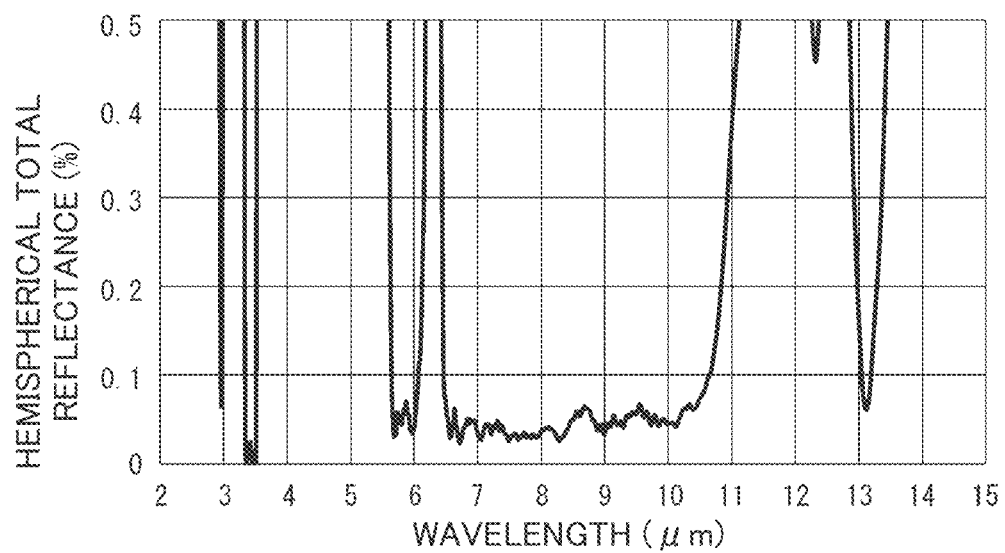
FIG. 7B is a diagram illustrating the hemispherical total reflectance in Comparative Example 1.

FIG. 7A is a diagram illustrating the hemispherical total reflectance in Example 1, and FIG. 7B is a diagram illustrating the hemispherical total reflectance in Comparative Example 1. Referring to FIGS. 7A and 7B, it can be understood that in Example 1, the hemispherical total reflectance is 0.3% or less in the range of wavelengths between 2 µm and 15 µm inclusive; in particular, the hemispherical total reflectance is 0.2% or less in the range of wavelengths between 5 µm and 15 µm inclusive; and the hemispherical total reflectance is 0.1% or less in the range of wavelengths between 7 µm and 14 µm inclusive. In contrast, it can be understood that in Comparative Example 1, the hemispherical total reflectance exceeds 0.3% at specific ranges of wavelengths between 2 µm and 7 µm inclusive and wavelengths between 10 µm and 15 µm inclusive. Based on above, it can be understood that in Example 1, infrared rays are absorbed even at the specific wavelengths since the absorption layer contains carbon black. Although Example 1 uses the Al plate as a base material, in comparison with Comparative Example 1, it can be understood that the absorption of infrared rays by the absorption layer eliminates the effect of reflection of infrared rays by the Al plate.

Figure 8A:
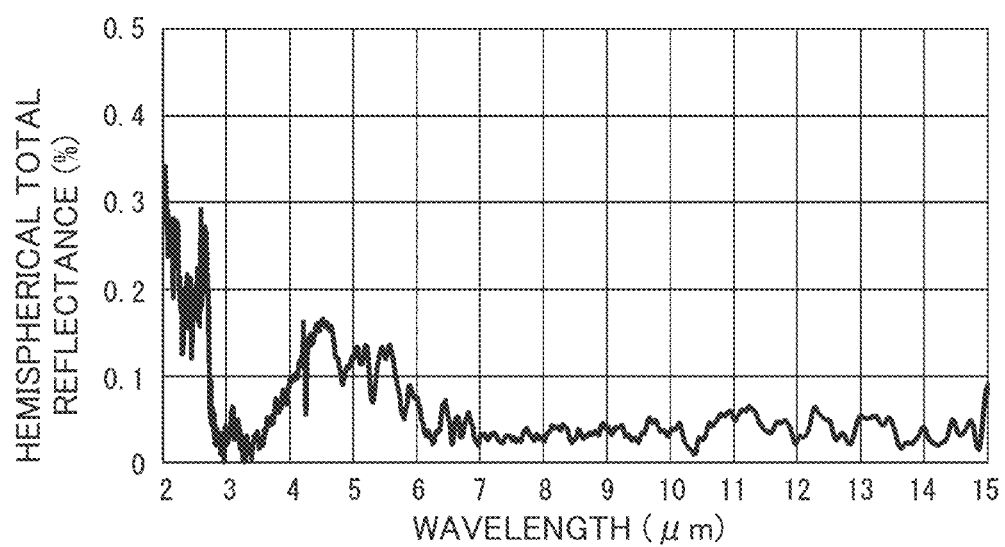
FIG. 8A is a diagram illustrating the hemispherical total reflectance in Example 2.
Figure 8B:
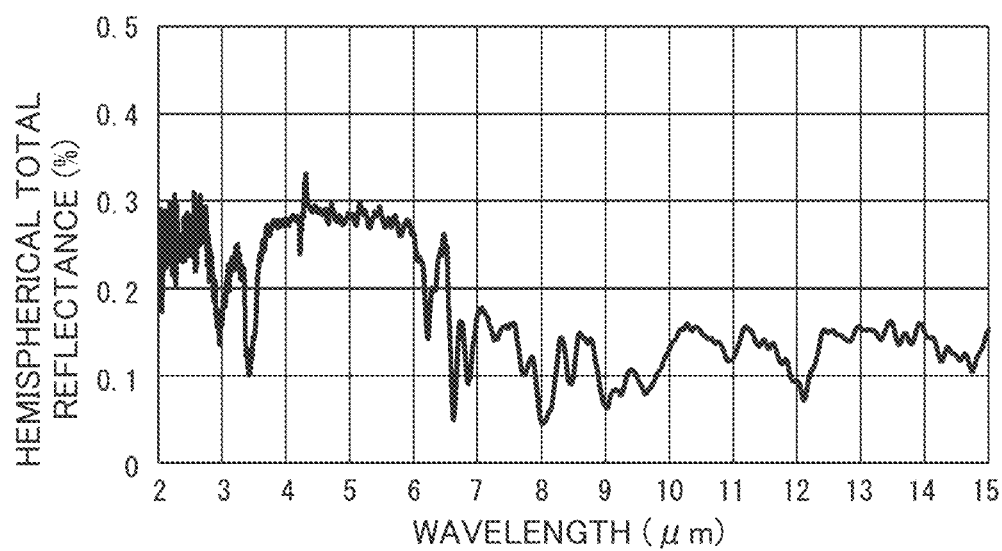
FIG. 8B is a diagram illustrating the hemispherical total reflectance in Comparative Example 2.
Figure 8C:
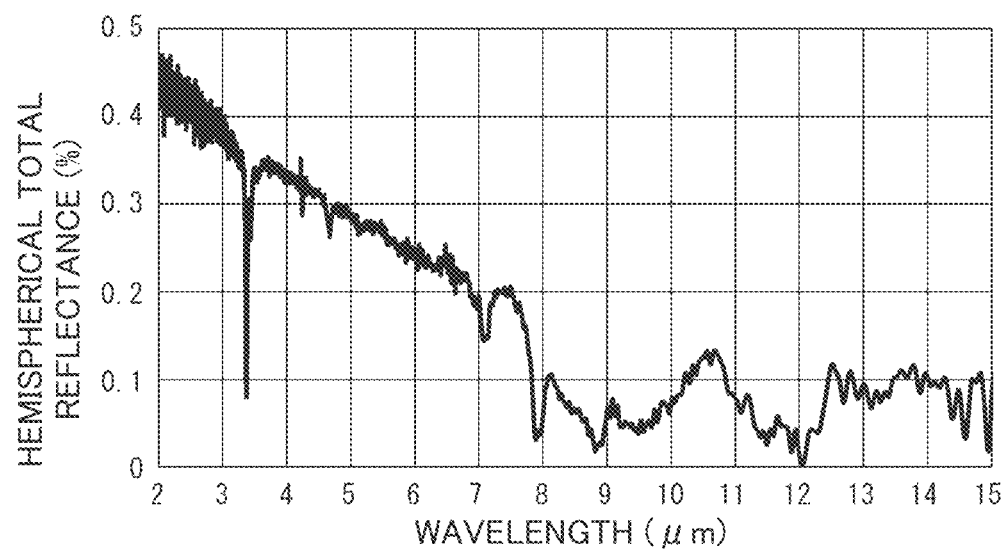
FIG. 8C is a diagram illustrating the hemispherical total reflectance in Comparative Example 3.
Figure 8D:
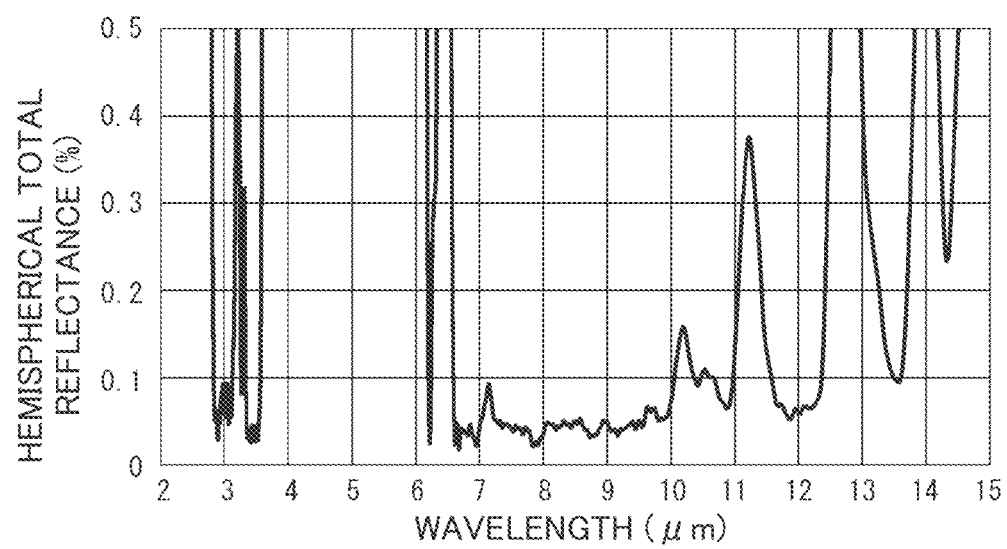
FIG. 8D is a diagram illustrating the hemispherical total reflectance in Comparative Example 4.

FIG. 8A is a diagram illustrating the hemispherical total reflectance in Example 2, and FIGS. 8B to 8D are diagrams illustrating the hemispherical total reflectance in Comparative Examples 2 to 4, respectively. Referring to FIG. 8A, it can be understood that in Example 2, the hemispherical total reflectance is 0.2% or less in the range of wavelengths between 3 µm and 15 µm inclusive (which encompasses the range of wavelengths between 5 µm and 15 µm inclusive), and the hemispherical total reflectance is 0.1% or less in the wavelength range between 6 µm and 14 µm inclusive. Referring to FIGS. 8B and 8C, the hemispherical total reflectance in Comparative Examples 2 and 3 is greater than the hemispherical total reflectance in Example 2, in the entire range of wavelengths between 3 µm and 15 µm inclusive. This is considered to be an effect of the presence of the surface layer without carbon black as a type of pigments, in Example 2.

Referring to FIGS. 8A and 8D, in Comparative Example 4, it can be understood that the hemispherical total reflectance exceeds 0.3% at the specific ranges of wavelengths between 2 µm and 7 µm inclusive and wavelengths between 11 µm and 15 µm inclusive. An absorption layer containing carbon black is not formed in Comparative Example 4, while the absorption layer is formed in Example 2, which explains why infrared rays are absorbed even at the specific wavelengths mentioned above in Example 2.

The molds used in Examples 1 and 2 and Comparative Examples 1, 2, and 4 were prepared as follows. A resin substrate of CR-39 having a thickness of 0.8 mm (product name: Baryotrak, manufactured by Fukuvi Chemical Industry, distributed by NAGASE-LANDAUER, Ltd.) was irradiated with neon (Ne) ions accelerated to an energy of 200 MeV using the AVF cyclotron at Takasaki Advanced Radiation Research Institute, National Institutes for Quantum Science and Technology. The irradiation density was set to $1 \times 10^6 /cm^2$. Next, the resin substrate irradiated with ion beams was etched by immersion in a 70° C., 6.38 normal (N) sodium hydroxide solution for 16 hours, and rinsed with water and dried to obtain a CR-39 plate with fine texture formed on the surface. Next, a main agent and a curing agent of a two-part curable silicone composition (manufactured by Shin-Etsu Silicone Co., Ltd. main agent SIM-360, curing agent CAT-360) were mixed at a ratio of 9:1; the mixture was dropped onto the textured surface of the CR-39 plate, defoamed in a vacuum desiccator, cured at room temperature for 12 hours and peeled off, whereby a silicone rubber mold having a light trapping structure formed on the surface was obtained. The mold used in Comparative Example 3 was a CR-39 plate having the fine texture formed on the surface.

The hemispherical total reflectance was measured using a hemispherical total reflectance measurement unit (gold-coated integrating sphere) on a Fourier Transform Infrared Spectrometer (model FT/IR-6300, type A) manufactured by JASCO Corporation, and measurement was conducted in the wavelength range of 2 μm to 15 μm (wavenumber range of 667 $cm^{-1}$ to 5000 $cm^{-1}$) with a wavenumber interval of 4 $cm^{-1}$. As a reference standard, a reflectance standard with calibrated value (manufactured by Labsphere, product name: Infragold) was used.

The sample to be measured was placed at the sample port of the integrating sphere. The background level (BG) was corrected, in which a signal level was detected when no sample was placed in the sample port and the measurement light was allowed to escape outside the integrating sphere, and this signal level was set as the background level (BG) and subtracted from a signal level when a sample was placed.

Figure 9:
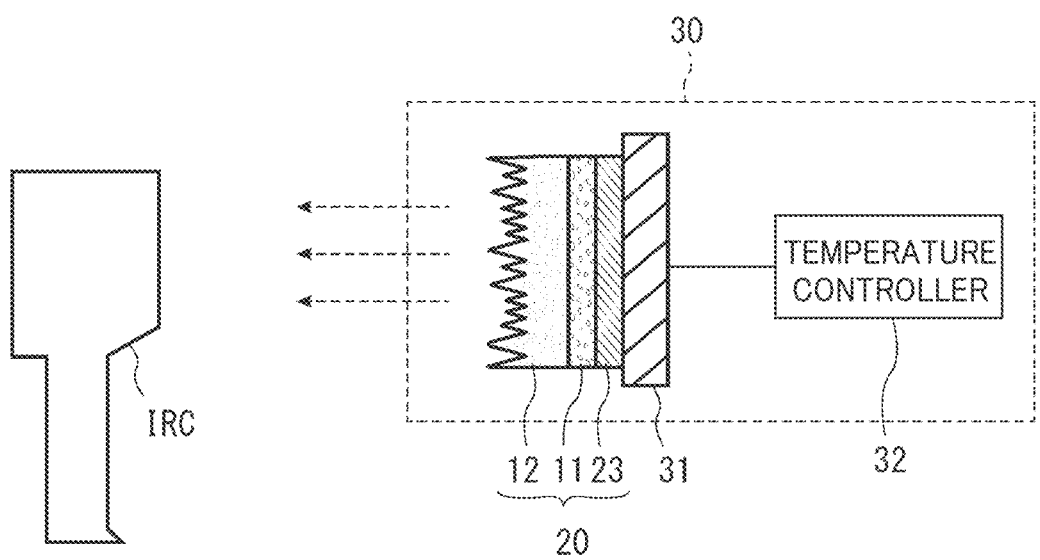
FIG. 9 is a schematic diagram illustrating a schematic configuration of a flat-plate blackbody device according to an embodiment.

FIG. 9 is a schematic diagram illustrating a schematic configuration of a flat-plate blackbody device according to an embodiment. Referring to FIG. 9 in conjunction with FIG. 4, the flat-plate blackbody device 30 includes the infrared absorber 20 illustrated in FIG. 4, an aluminum plate 31 disposed in contact with the base material 23 of the infrared absorber 20, and a temperature control unit 32. The temperature control unit 32 is connected to a mechanism (not illustrated) for heating/cooling the aluminum plate 31, a sensor (not illustrated) for measuring the temperature of the aluminum plate 31, and the like. The temperature control unit 32 sets the temperature of the infrared absorber 20 to a predetermined temperature via the aluminum plate 31. An infrared camera IRC can be calibrated regarding the measurement temperature by measuring the wavelength and intensity of infrared rays emitted from the infrared absorber 20.

Due to extremely low hemispherical total reflectance of the infrared absorber 20, the flat-plate blackbody device 30 exhibits extremely low reflection of external infrared rays on the surface layer 12 of the infrared absorber 20. The reflected infrared rays in this case can introduce noise during temperature calibration of the infrared camera IRC, but are extremely minimal. Therefore, the infrared camera IRC receives infrared rays emitted from the infrared absorber 20 in response to the temperature as set by the temperature control unit 32 of the flat-plate blackbody device 30, enabling more accurate temperature calibration. Note that the flat-plate blackbody device 30 may use the infrared absorber 10 illustrated in FIG. 1, instead of the infrared absorber 20.

Figure 10:
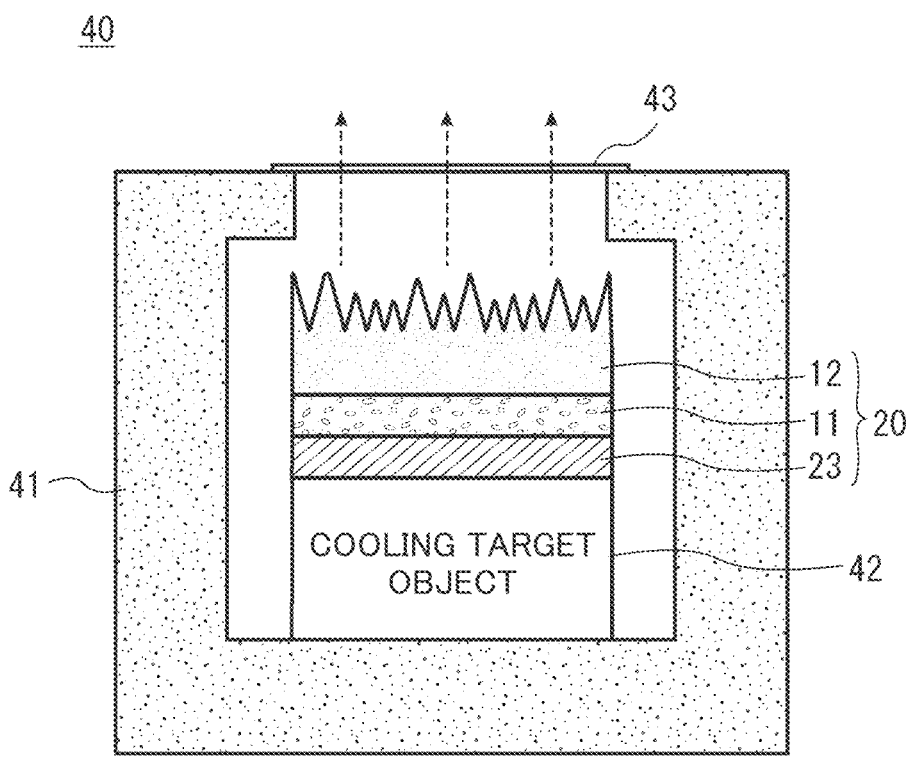
FIG. 10 is a schematic diagram illustrating a schematic configuration of a radiative cooling device according to an embodiment.

FIG. 10 is a schematic diagram illustrating a configuration of a radiative cooling device according to one embodiment. Referring to FIG. 10 in conjunction with FIG. 4, the radiative cooling device 40 includes a heat insulating container 41, an infrared absorber 20 disposed so that the base material 23 comes into contact with the cooling target object 42 accommodated in the heat insulating container 41, and a film 43 disposed so as to cover the opening of the upper portion of the heat insulating container 41, which prevents convection between the inside and the outside of the heat insulating container 41, thereby suppressing an internal temperature rise. The radiative cooling device 40 is capable of cooling the cooling target object 42 by externally discharging the thermal energy by radiating the infrared rays radiated from the infrared absorber 20 from the opening of the heat insulating container 41 via the film 43. The radiative cooling device 40 is suitable for dissipating heat, for example, from a device within a system, and the cooling target object 42 illustrated in FIG. 10 may be such a device. The heat insulating container 41 is not always necessary, depending on the application.

The embodiments and examples of the present invention have been described above in detail; however, the present invention is not limited to the specific embodiments and examples as described, and various modifications and changes are possible within the scope of the claims of the present invention as set forth. In the above embodiments and examples, the description has been focused on the hemispherical total reflectance at infrared wavelengths; however, the infrared absorber exhibits an extremely low hemispherical total reflectance even in the visible light wavelength range, and can also be used as an anti-reflective material in the visible light wavelength range.

EXPLANATION OF REFERENCE NUMERALS 10, 20 INFRARED ABSORBER
11 ABSORPTION LAYER
12 SURFACE LAYER
13 LIGHT TRAPPING STRUCTURE
14 PROJECTION
15 CARBON BLACK PARTICLES
23 BASE MATERIAL
30 FLAT-PLATE BLACKBODY DEVICE
40 RADIATIVE COOLING DEVICE

The invention claimed is:

1. An infrared absorber comprising:
   an absorption layer consisting of carbon black and resin; and
   a surface layer consisting of substantially pigment-free resin, formed on the absorption layer and including a light trapping structure with a plurality of microscopic projections formed on a surface,
   wherein the infrared absorber is configured to have a hemispherical total reflectance of 0.2% or less in a range of infrared wavelengths between 5 μm and 15 μm inclusive.

2. The infrared absorber according to claim 1, wherein the infrared absorber is configured to have a hemispherical total reflectance of 0.1% or less in a range of infrared wavelengths between 7 μm and 14 μm inclusive.

3. The infrared absorber according to claim 1, wherein the light trapping structure of the surface layer is manufactured with a method comprising the steps of:
   irradiating a resin substrate with an ion beam; etching the resin substrate irradiated using an alkaline solution to form a textured surface on a surface of the resin substrate; applying a resin liquid onto the textured surface of the resin substrate etched to form a mold; applying a resin liquid onto a surface of the absorption layer; and embossing the resin liquid with the mold including a plurality of microscopic projections formed on its surface, before the resin liquid cures.

4. The infrared absorber according to claim 1, wherein the light trapping structure includes a surface with a plurality of projections formed to protrude outward from the surface; tips of the projections have a connected ridge-like shape or a conical shape; a cross section of the projection has a shape that gradually widens from the tips toward the base; and a distance between the adjoining ridges or the adjoining conical tips is 0.1 μm to 100 μm.

5. The infrared absorber according to claim 1, wherein a weight ratio of the carbon black to the resin is 1% to 20% in the absorption layer.

6. The infrared absorber according to claim 1, wherein a thickness of the absorption layer is 20 μm to 500 μm.

7. The infrared absorber according to claim 1, wherein the resin of the surface layer is at least one resin selected from the group consisting of ultraviolet curing resin, silicone resin, epoxy resin, acrylic resin, polyester resin, and polyurethane resin.

8. The infrared absorber according to claim 1, wherein a thickness of the surface layer is 100 μm to 200 μm.

9. A flat-plate blackbody device comprising the infrared absorber according to claim 1.

10. A radiative cooling device comprising the infrared absorber according to claim 1.

11. The infrared absorber according to claim 1, further comprising a base material under the absorption layer, wherein the base material consists of a thermally conductive material.

12. The infrared absorber according to claim 11, wherein the base material is selected as a substrate that includes at least one metal chosen from the group consisting of aluminum, copper, silver, and gold.

13. The infrared absorber according to claim 11, wherein the base material is selected as a substrate that includes at least one non-metal material chosen from the group consisting of silicon substrate, SiC substrate, and AlN substrate.

14. A method of manufacturing an infrared absorber, the method comprising the steps of:
preparing a mold, including a substep of irradiating a resin substrate with an ion beam;
forming an absorption layer using carbon black and resin;
applying a substantially pigment-free resin liquid onto a surface of the absorption layer to form a precursor of a surface layer;
embossing a surface of the precursor with the mold including a surface with a plurality of microscopic projections formed on the surface before the resin liquid cures, and curing the resin liquid to form a surface layer including a light trapping structure,
wherein the infrared absorber thus formed is configured to have a hemispherical total reflectance of 0.2% or less in a range of infrared wavelengths between 5 μm and 15 μm inclusive.

* * * * *